United States Patent
White et al.

(10) Patent No.: US 11,036,603 B1
(45) Date of Patent: Jun. 15, 2021

(54) DISTRIBUTED TEST SUITE TOOLS

(71) Applicant: Scale Computing Inc., Los Altos, CA (US)

(72) Inventors: Philip White, San Mateo, CA (US); Michael McLaughlin, San Mateo, CA (US)

(73) Assignee: Scale Computing Inc, Indianapolis, IN (US)

( * ) Notice: Subject to any disclaimer, the term of this patent is extended or adjusted under 35 U.S.C. 154(b) by 402 days.

(21) Appl. No.: 14/793,748

(22) Filed: Jul. 8, 2015

Related U.S. Application Data

(63) Continuation of application No. 13/183,898, filed on Jul. 15, 2011, now Pat. No. 9,104,651.

(51) Int. Cl.
*G06F 11/22* (2006.01)

(52) U.S. Cl.
CPC ................................ *G06F 11/2294* (2013.01)

(58) Field of Classification Search
CPC .. G06F 11/079; G06F 11/0748; G06F 11/263; G06F 11/0793; G06F 11/2268; G06F 11/3692; G06F 11/3688; G06F 11/0751; G06F 11/3476; G06F 11/2289; G06F 11/3207
See application file for complete search history.

(56) References Cited

U.S. PATENT DOCUMENTS

| | | | | |
|---|---|---|---|---|
| 4,803,683 | A * | 2/1989 | Mori | G06F 11/22 714/31 |
| 6,910,158 | B2 * | 6/2005 | Jones | G06F 11/261 714/31 |
| 7,000,224 | B1 * | 2/2006 | Osborne, II | G06F 11/3688 714/738 |
| 7,165,189 | B1 * | 1/2007 | Lakkapragada | G06F 11/2294 709/220 |
| 8,255,861 | B2 * | 8/2012 | Bhinge | G06F 11/263 714/48 |
| 2004/0045001 | A1 * | 3/2004 | Bryant | G06F 9/505 718/100 |
| 2011/0167425 | A1 * | 7/2011 | Lurie | G06F 9/5072 718/102 |

* cited by examiner

*Primary Examiner* — Nadeem Iqbal

(57) ABSTRACT

Reliably testing distributed systems in which multiple components interact, including: provisioning resources by a test leader, directing components to perform actions required by test suites, and reporting results. Provisioning resources might be batched in advance, and might overlap resources for multiple test suites. Provisioning and directing might occur on an as-needed basis, might be performed concurrently, and might be reordered for relatively better performance. Directing actions might occur on command by test leaders, might occur by synchronization of resources, or might occur by resources requesting permission to proceed. Resources might act only upon direction by test leaders, or might act on their own initiative when synchronized. Results might be reported to the test leader for comparison, maintained in a database for access by the test leader, or compared by resources on their own initiative in response to instructions from the test leader.

15 Claims, 2 Drawing Sheets

DISTRIBUTED TEST SUITE TOOLS

BACKGROUND

Some computing systems include multiple components which interact, particularly in which those computing systems are relatively complex and in which there is substantial code directing their operation. It might occur that system coders or system designers have devised one or more "test suites". Test suites are disposed for emulating possible conditions which the system might undergo, and for determining if code for handling those possible conditions handles those conditions correctly. For just one example, in some complex systems there might occur conditions in which a $1^{st}$ element locks a data structure, while a $2^{nd}$ element attempts to access that data structure. If the lock is not performed properly, the $2^{nd}$ element might be able to alter that data structure at times in which the $1^{st}$ element relies on its being unchanged, which could result in an error.

A $1^{st}$ problem in the known art occurs in cases in which the multiple components are situated at, or controlled from, relatively distributed elements. Such relatively distributed elements might include those which are logically or physically relatively disparate or remote. This can present a problem when it is desired that the test suite coordinate actions of those relatively distributed elements, such as for example, causing a $1^{st}$ such element and a $2^{nd}$ such element to operate in conjunction, or to operate in relative time proximity. For just one example, in some systems there might occur conditions in which a $1^{st}$ element performs two operations A and B in relatively quick succession, while a $2^{nd}$ element performs an operation X between those two. Thus, while the $1^{st}$ element expects (A then B), the actual sequence is (A then X then B). If the system is not well-designed, or if the code is not well-disposed for handling this case, this could result in an error.

Known systems include designing test suites so that the $1^{st}$ element and the $2^{nd}$ element attempt to coordinate their operations in time succession. While these known systems might be able to adequately test some cases, they have at least the drawback that there appear to be cases which these known systems are unable to test adequately and reliably.

A $2^{nd}$ problem in the known art occurs in cases in which the test suite requires for operation a particular set of components or component types. For just one example, testing a locking mechanism in a distributed system would likely involve a data structure to be locked, a component A that locks that data structure, and a component B that attempts to access that data structure despite the lock. In some cases, it might be desirable for the system to reject the attempted access to the locked data structure; in other cases, it might be desirable for the system to break the lock, allow the attempted access, and so inform the component A that set the lock. In such cases, it would generally be required to identify components A and B, and the lockable data structure, before proceeding with the test suite.

Known systems include operating test suites "by hand", that is, using a human operator to select the components to be included in the test suite, using a human operator (possibly the same one) to cause the test suite to operate on those components, and using a human operator (again, possibly the same one) to review a set of results from the test suite. One such known system includes pre-allocating multiple devices which each attempt to access and modify a locked data structure. Once the operator has selected the multiple devices and caused each of the multiple devices to run the test suite, the operator can check to see if the data structure includes a data value which would occur if the system were operating correctly. While this known system might be able to adequately test some cases, it has at least the drawback that it involves significant operator intervention just to perform the test.

A $3^{rd}$ problem in the known art occurs in cases in which there is more than one such test suite to perform. In some cases, the more than one test suite might re-use the same resources. In some cases, the more than one test suite might use distinct resources, but an order of allocation of those resources might have a substantial effect on the efficiency, or another measure of performance, of the test suite.

SUMMARY OF THE DESCRIPTION

We provide techniques for reliably testing distributed systems in which multiple components might interact. These techniques might include provisioning resources for those multiple components to use, directing those multiple components to perform the actions required of them by one or more test suites, and reporting results as indicated by test suites.

A test leader provisions one or more resources to be tested, such as in response to a set of test suites. For some examples and without limitation, the one or more resources might include data structures, processors, storage devices, and otherwise. The data structures might include databases, locks, shared directories, test results, and otherwise.

In one embodiment, the test leader provisions needed resources for all the test suites to be performed, possibly allocating one or more such resources to be used in more than one such test suite. However, in the context of the invention, there is no particular requirement for any such limitation. For a $1^{st}$ example and without limitation, the test leader might provision resources for an initial set of test suites, even as few as only the first one test suite, and provision such other or further resources as might be needed for additional test suites as those additional test suites arrive for performance. For a $2^{nd}$ example and without limitation, the test leader might provision resources for multiple test suites to be performed concurrently. For a $3^{rd}$ example and without limitation, the test leader might select an order in which test suites are performed, with the effect of substantially optimizing efficiency, or another measure of performance, in performing those test suites.

The test leader directs the operation of test elements, such as for example by directing those test elements to perform operations at times or upon the command of the test leader. For some examples and without limitation, the test leader might deliberately, in response to one or more test suites, direct a $1^{st}$ element to perform two operations A and B in relatively quick succession, and direct a $2^{nd}$ element performs an operation X between those two, with the effect of testing whether the system operates properly in such a case.

In one embodiment, the test leader sends messages to each test element to command it to perform those operations. However, in the context of the invention, there is no particular requirement for any such limitation. For example and without limitation, the test leader might synchronize multiple test elements, distribute instructions for operations to be performed as part of the test suite, and direct those synchronized test elements to perform their operations, on their own initiative, at designated times. This has the effect that multiple test elements can coordinate their activity according to one or more test suites, such as for example to operate in conjunction, or to operate in relative time proximity.

The test leader follows instructions for reporting results, such as indicated by test suites. The test leader might examine results from one or more components, in response to one or more test suites. For some examples and without limitation, the test leader might determine whether one or more components have been returned to their original pre-test state, might determine whether one or more messages were successfully received or responded to, might review data values found in one or more data structures, or otherwise. These tests might have the effect of determining whether any system errors were uncovered by one or more test suites.

In one embodiment, the test leader sends messages to each test element to command it to return information to the test leader, with the effect that the test leader can compare that information with whatever is expected by one or more test suites. However, in the context of the invention, there is no particular requirement for any such limitation. For example and without limitation, the test leader might direct one or more test elements to send such information to the test leader, on their own initiative, when available. This has the effect that multiple test elements can perform any analytics regarding their own local state, without having to transfer substantial data, such as in a networked environment, to the test element.

While this application sometimes describes particular errors, inconsistencies, or tests relating to particular hardware or software, there is no intent to restrict the description to the specific concerns mentioned, or to the specific hardware or software mentioned. In general, references to any particular concerns should be read as applicable to other and further concerns, whether of a similar nature or otherwise. In general, references to any particular hardware or software should be read as applicable to software (instead of hardware), or hardware (instead of software), or to some combination or conjunction thereof, whether of a similar nature or otherwise.

DESCRIPTION

Generality of the References

Figure 1:
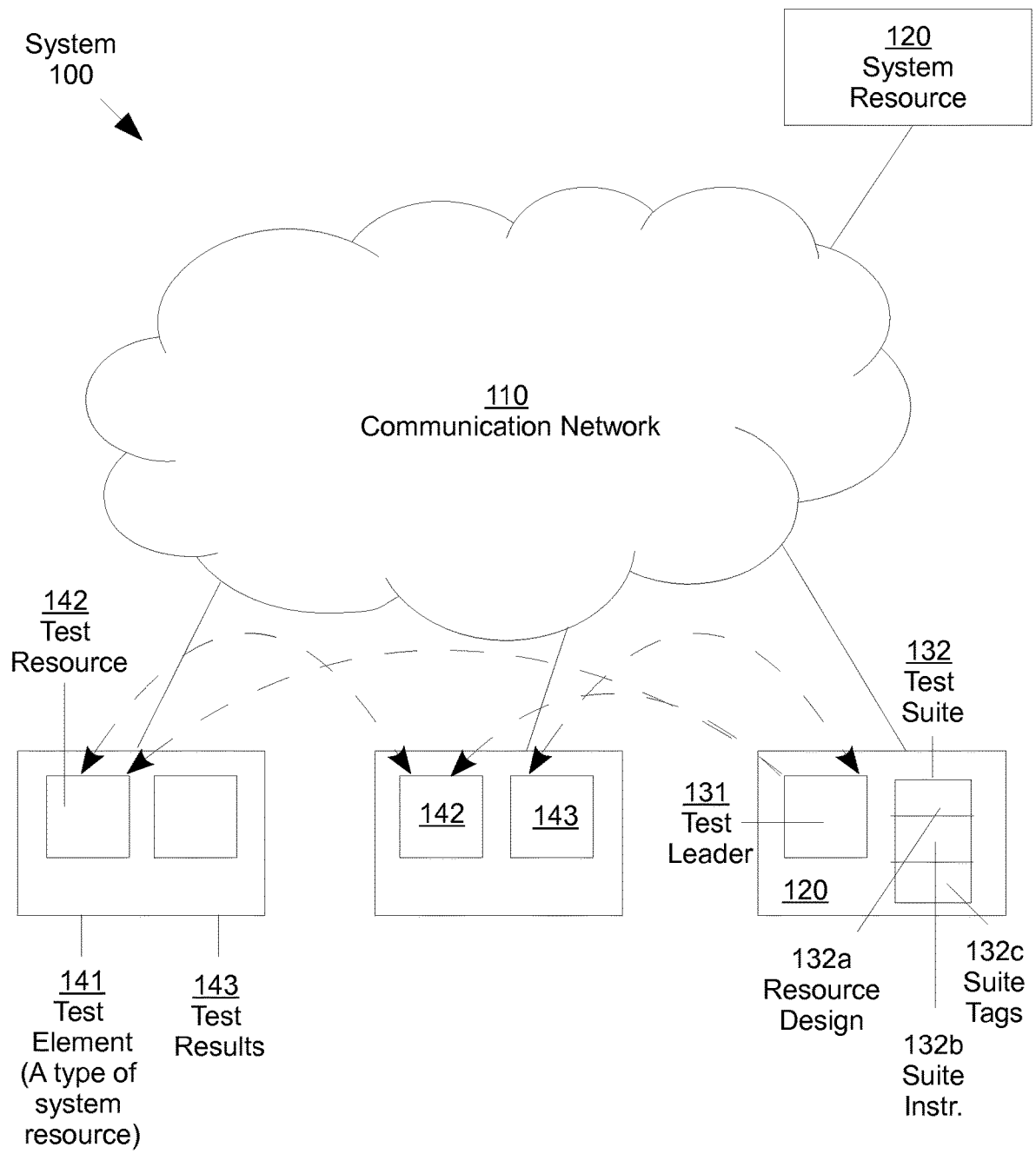
FIG. 1 shows a conceptual drawing of a system including at least one or more communication networks and one or more system resources.

This application should be read in the most general possible form. This includes, without limitation, the following:

References to contemplated causes and effects for some implementations do not preclude other causes or effects that might occur in other implementations.

References to one embodiment or to particular embodiments do not preclude alternative embodiments or other embodiments, even if completely contrary, where circumstances would indicate that such alternative embodiments or other embodiments would also be workable.

References to particular hardware or software should be read as also applicable to software (instead of hardware), or hardware (instead of software) or to some combination or conjunction thereof, whether of a similar nature or otherwise.

References to particular reasons or to particular techniques do not preclude other reasons or techniques, even if completely contrary, where circumstances would indicate that the stated reasons or techniques are not as applicable.

References to "preferred" techniques generally mean that the inventors contemplate using those techniques, and think they are best for the intended application. This does not exclude other techniques for the invention, and does not mean that those techniques are necessarily essential or would be preferred in all circumstances.

References to specific techniques include alternative and more general techniques, especially when discussing aspects of the invention, or how the invention might be made or used.

Generality of the Techniques

Technologies shown or suggested by this description should also be thought of in their most general possible form. This includes, without limitation, the following: The phrases and terms "causing", "directing", "instructing", "to cause", "to direct", "to instruct" (and similar phrases and terms) generally indicates any technique in which one or more 1st devices or methods induce one or more $2^{nd}$ devices or methods to take action, whether or not that action is assured (for example and without limitation, including a message, a posted change to a data structure, or otherwise).

The phrases and terms "constantly", "continually", "from time to time", "occasionally", "periodically" (and similar phrases and terms) generally indicate any case in which a method or technique, or an apparatus or system, operates over a duration of time, including without limitation any case in which that operation occurs only part of that duration of time. For example and without limitation, these terms would include, without limitation, methods which perform an operation as frequently as feasible, on a periodic schedule such as once per second or once per day, in response to an alarm or trigger such as a value reaching a threshold, in response to a request or an implication of a request, in response to operator intervention, otherwise, and to combinations and conjunctions thereof.

The phrases and terms "distribute", "to distribute" (and similar phrases and terms) generally indicate any case in which one or more $1^{st}$ devices or methods, induce information (for example but without limitation, data or instructions) to appear at one or more $2^{nd}$ devices or methods, whether or not that information is assured to appear thereat (for example and without limitation, including a message, a posted change to a data structure, or otherwise).

The phrases and terms "effect", "with the effect of" (and similar phrases and terms) generally indicate any natural and probable consequence, whether or not assured, of a stated arrangement, cause, method, or technique, without any implication that an effect or a connection between cause and effect are intentional or purposive.

The phrases and terms "data", "information" (and similar phrases and terms) generally indicate any form of bits/digits or values (whether analog, digital, or otherwise), collection or content, coincidence or correlation (whether causal or otherwise), evidence or logical tendency (whether probabilistic, pseudo-probabilistic or otherwise), or other indication of any kind from which a computing device, Turing-equivalent equivalent device, user, Artificial Intelligence, or other thinking being, might be able to draw conclusions. Although information is described herein with respect to classical bit-representations, in the context of the invention, there is no particular requirement for any such limitation. Information might be of a classical or quantum nature, might be of a Bayesian or Shannon or Kolmogorov or algorithmic nature, or might take on any other aspect consistent with the advantages or purposes described herein.

The term "instruction" (and similar phrases and terms) generally indicates any information or other arrangement or disposal or matter or energy, having the property of being interpretable by a computing device, or other device, to perform operations (possibly conditional operations, parallel operations, pipelined operations, or other dispositions of method steps or operations as might be known or developed in the many fields of computing science), whether or not responsive to inputs, states or state-changes, or other instructions, from any source whatever, or otherwise, or combinations or conjunctions thereof.

The phrases and terms "methods, physical articles, and systems", "techniques" (and similar phrases and terms) generally indicate any material suitable for description, including without limitation all such material within the scope of patentable subject matter, or having ever been considered within the scope of patentable subject matter, or which might colorably be within the scope of patentable subject matter, notwithstanding most recent precedent.

The phrase "on its own initiative" (and similar phrases and terms) generally indicates that one or more devices or methods operate without instruction from an external source. For example and without limitation, a $1^{st}$ device might operate "on its own initiative" if it acts responsive to data or instructions at that $1^{st}$ device, or responsive to data or instructions accessible by that $1^{st}$ device, or otherwise without being explicitly directed by a $2^{nd}$ device.

The phrases and terms "pseudo-random", "random" (and similar phrases and terms) generally indicate any technique of any kind, in which information is generated or selected in a manner not predictable to the recipient. In the context of the invention, data, information, numbers, processes, or otherwise, referred to herein as "random", need not be equidistributed (or have any other particular distribution) over anything in particular, and might in general be pseudo-random in addition to, or in lieu of, being random.

The term "relatively" (and similar phrases and terms) generally indicates any relationship in which a comparison is possible, including without limitation "relatively less", "relatively more", and the like. In the context of the invention, where a measure or value is indicated to have a relationship "relatively", that relationship need not be precise, need not be well-defined, need not be by comparison with any particular or specific other measure or value. For example and without limitation, in cases in which a measure or value is "relatively increased" or "relatively more", that comparison need not be with respect to any known measure or value, but might be with respect to a measure or value held by that measurement or value at another place or time.

The term "substantially" (and similar phrases and terms) generally indicates any case or circumstance in which a determination, measure, value, or otherwise, is equal, equivalent, nearly equal, nearly equivalent, or approximately, what the measure or value is recited. The terms "substantially all" and "substantially none" (and similar phrases and terms) generally indicate any case or circumstance in which all but a relatively minor amount or number (for "substantially all") or none but a relatively minor amount or number (for "substantially none") have the stated property. The terms "substantial effect" (and similar phrases and terms) generally indicate any case or circumstance in which an effect might be detected or determined.

The phrases "this application", "this description" (and similar phrases and terms) generally indicate any material shown or suggested by any portions of this application, individually or collectively, including all documents incorporated by reference or to which a claim of priority can be made or is made, and include all reasonable conclusions that might be drawn by those skilled in the art when this application is reviewed, even if those conclusions would not have been apparent at the time this application is originally filed.

The invention is not in any way limited to the specifics of any particular examples disclosed herein. After reading this application, many other variations are possible which remain within the content, scope and spirit of the invention; these variations would be clear to those skilled in the art, without undue experiment or new invention.

Real-World Nature

The invention includes techniques, including methods, physical articles, and systems, that receive real-world information dictated by real-world conditions (not mere inputs to a problem-solving technique). The techniques provided by the invention are transformative of the information received, at least in the senses that a $1^{st}$ type of information (information provided as part of test suites, such as for example instructions, data, and expected results) is transformed into actions responsive to that $1^{st}$ type of information; and those actions responsive to that $1^{st}$ type of information provide a $2^{nd}$ type of information (information regarding actual results, such as for example whether any errors have been detected).

The invention also includes techniques that are tied to a particular machine, at least in the sense that a system includes particular types of elements (test leaders, test elements, test suites including data and instructions, and devices and methods involved in performing tests, such as for example as described herein); and a system that responds in distinct and defined ways in response to data and instructions regarding test suites and their performance, such as for example as described herein.

This description includes a preferred embodiment of the invention with preferred process steps and data structures. After reading this application, those skilled in the art would recognize that embodiments of the invention can be implemented using general purpose computing devices or switching processors, special purpose computing devices or switching processors, other circuits adapted to particular process steps and data structures described herein, or combinations or conjunctions thereof, and that implementation of the process steps and data structures described herein would not require undue experimentation or further invention.

DEFINITIONS AND NOTATIONS

The following definitions are exemplary, and not intended to be limiting in any way:

The phrase "local state" (and similar phrases and terms) generally indicate any component or element, or aspect of the system, referring to data or information present at, included in, or accessible to, a hardware device or software element.

The terms "provision", "provisioning" (and similar phrases and terms) generally indicate any method or technique, or aspect of the system, in which a resource is allocated for use, either for use at the current time or later.

The phrases and terms "resource", "test resource" (and similar phrases and terms) generally indicate any component or element, or aspect of the system, whether a hardware device or a software element, or including a combination or conjunction thereof, suitable for use with respect to a test suite.

The phrases and terms "state", "state of a system" (and similar phrases and terms) generally indicate any data or information, having a bearing on any aspect of element of a system, including without limitation possibly representing only a portion or a subsystem thereof.

The phrase "test element" (and similar phrases and terms) generally indicate any component or element, or aspect of the system, whether a hardware device or software element, or some combination or conjunction thereof, suitable for use with respect to a test suite.

The phrase "test leader" (and similar phrases and terms) generally indicate any component or element, or aspect of the system, whether a hardware device or software element, or some combination or conjunction thereof, suitable for use for performing the functions described herein of a test leader, including without limitation one or more of: provisioning test elements, directing the operation of test elements, and determining a set of presentable results.

The phrase "test suite" (and similar phrases and terms) generally indicate any component or element, data or information, or other aspect of the system, suitable for interpretation as indicating data or information as described herein for use for the functions described herein of a test suite, including without limitation one or more of: a set of test resources, a set of operations to be performed by test elements, and a set of information to be used for presentable results.

After reading this application, those skilled in the art would recognize that these definitions would be applicable to techniques, methods, physical elements, software elements, combinations or conjunctions of physical elements and software elements, and systems—not currently known, or not currently known to be applicable by the techniques described herein—including extensions thereof that would be inferred by those skilled in the art after reading this application, even if not obvious to those of ordinary skill in the art before reading this application.

FIGURES AND TEXT

Where described as shown in a figure, one or more elements might include
- other items shown in the figure in addition to, or operating in combination or conjunction with, those particular one or more elements (or that those particular one or more elements in combination or conjunction with one or more other elements, whether shown or not shown in the figure, and whether described or not described with respect to the figure);
- one or more other elements not shown in the figure, but whose inclusion would be known to those skilled in the art, or which would be known after reasonable investigation, without further invention or undue experimentation; and
- subparts of those one or more elements, whether shown or not shown in the figure, which might be convenient for operation of those one or more elements, but which are not necessarily required in the described context, or which might be necessary for operation of those one or more elements in the described context, but which are not necessary for description at a level understandable to those skilled in the art.

Where described or shown in a figure, apparatus elements might include
- physical devices having the properties described or carrying out the functions associated therewith; such physical devices might include electronic circuits or other physical devices, whether specially designed for those properties or functions, or whether more generally designed and where adapted or configured for those properties or functions;
- electronic or other circuitry operating under control of software elements, those software elements being embodied in a physical form for at least a duration of time, with the effect that the electronic or other circuitry has the properties or functions associated therewith when operating under control of those software elements;
- software components having the properties described or carrying out the functions associated therewith; such software components might include information interpretable as instructions, associated with devices capable of performing those instructions, whether specially designed for those functions or instructions, or whether more generally designed and where adapted or configured for those functions or instructions.

Where described or shown in a figure, apparatus elements, including either physical elements or software components, might be coupled
- in a manner as shown in the figure, or where no specific coupling is shown, in a manner known to those skilled in the art (for example and without limitation, apparatus elements might be coupled mechanically, electronically, electromagnetically, or by one or more other techniques known to those skilled in the art, either in the alternative or in combination or conjunction, whether or not obvious at the time of this description, while software components might be coupled using any of the techniques known in the many fields of computer science, with or without assistance of additional software components, operating system elements, or by one or more other techniques known to those skilled in the art, either in the alternative or in combination or conjunction, whether or not obvious at the time of this description);
- in a manner as described in text referring to the figure, or where no specific coupling is described, in a manner known to have the properties or functions associated therewith, in at least some contexts as contemplated by the inventors or as implied by the description;
- in a manner other than as shown in the figure, or other than as described in the text, where the figure or text indicates that other such manners might be contemplated in the making or use of the invention, either in the alternative or in combination or conjunction, whether or not obvious at the time of this description;
- in a manner other than as shown in the figure, or other than as described in the text, where adaptation or configuration thereof might be involved in the properties or functions associated therewith.

For example and without limitation, where a context for making or use of the invention might involve a distinct adaptation or configuration thereof, those apparatus elements or software components might be so adapted or so configured to have, or to substantially approximate, properties or functions as described herein, or as would be known to those skilled in the art.

Where described or shown in a figure, flow labels, method steps, and flow of control might include
one or more physical devices operating in combination or conjunction to perform the operations described, with the properties or functions thereof;
one or more portions of a single device, or of a set of devices coupled or in communication, or otherwise operating in combination or conjunction thereof, to perform the operations described, with the properties or functions thereof;
one or more software components operating in combination or conjunction, or with the assistance of other known techniques known in the many fields of computer science, to perform the operations described, with or without assistance of additional software components, such as for example operating system elements, firmware elements, or related elements.

For example and without limitation, one or more software threads, processes, data structures, or other constructs known in the many fields of computing sciences and engineering, coupled or in communication, or otherwise operating in combination or conjunction thereof, to perform the operations described, with the properties or functions thereof.

Where described or shown in a figure, flow labels, method steps, and flow of control might include
one or more parallel flows of control, operating concurrently or in cooperation, in parallel or in a pipelined manner, or otherwise as known in the many fields of computing sciences and engineering,
with the effect that the flow labels, method steps, flows of control, or operations might be performed or traversed in one or more orderings, whether directly specified in the figures or text, or as indicated therein as alternatives, or as substantially having the same properties or functions, or otherwise having substantially the same effect.

For example and without limitation, in the context of the invention, there is no particular requirement for the flow labels, method steps, flow of control, or operations, to occur in the order they are coupled or otherwise shown in the figures, or in the order they are described in the text.

Where distinct or separate data elements are shown as being used or operated upon, those distinct or separate data elements might be substantially so used or substantially so operated upon in parallel, in a pipelined manner, or otherwise.

Where an individual data element is shown as being used or operated upon, it might occur that the individual data element is substantially replicated, at least in part, with the effect that the individual data element might be used by more than one method step, flow of control, or operation, concurrently or in parallel or otherwise, consistently (or inconsistently with a form of reconciliation) or otherwise.

For example and without limitation, in the context of the invention, there is no particular requirement for the flow labels, method steps, flow of control, or operations, to occur in the order they are coupled or otherwise shown in the figures, or in the order they are described in the text. Where described or shown in a figure, or in the text, machines, articles of manufacture, or compositions of matter (or of matter and energy), might be disposed for including or maintaining, whether relatively permanently or relatively evanescently, or otherwise, information.

Where such information is specified, either relatively generally or relatively in detail, such information might be included or maintained by any technique involving the use of matter, combinations or conjunctions of matter and energy, techniques derived from computing sciences or information sciences, or other techniques in which such information might be derived or interpretable by one or more computing devices, at a later time or distinct place, or at another event in space-time. Although this description focuses on techniques for encoding information presently known to those skilled in the art, or where no such techniques are described, on techniques known in the many fields of computing science or information science, in the context of the invention, there is no particular requirement therefore. For example and without limitation, any and all such techniques for including or maintaining information, retrievable at a later time or distinct place, or at another event in space-time, might be applicable, even if currently not obvious to those of ordinary skill in the art.

Where such information is specified, that information might be included or maintained by any one or more coding schemas, or other techniques for maintaining information against error, loss, inaccessibility, or other issues, which should be generally inferred by the reader when construing or interpreting techniques described herein. For example and without limitation, techniques such as use of data backup or recovery, data mirroring, parity information, redundant encoding, triple-modular or other redundancy, and other methods known in the many fields of computing science or information science, should generally be implied by this description whenever inclusion, maintenance, transmission, copying, or other treatments of information are involved.

Where such information is specified, that information might be contemplated to be included or maintained with the effect of retaining that information for use in another context, at another place or time, in another device or in a similar or identical device otherwise distinct, or embodied in a form suitable for carriage or copying from a $1^{st}$ place or time to a $2^{nd}$ place or time, such as on a device being at least in part electromagnetic, optical, physically configured, or making use of quantum-mechanical principles with respect to information.

Where such information is specified, that information might be segregated into individual portions, each representing whole number of bits, partial bits, probabilistic or conditionally probabilistic conditions from which information might be deduced, or otherwise. Although this description focuses on information-bearing articles which can be written, read, or transported in individual units, in the context of the invention, there is no particular requirement therefor.

For example and without limitation, information might be recorded, stored, or otherwise maintained on one or more physical elements or devices, with the information being separated either logically, physically, or holographically (the latter including the possibility that more than one such physical element or device might be involved in recovery or interpretation of the information).

For a $1^{st}$ example and without limitation, in one embodiment, a RAID disk-drive system might include information with the property that any one individual device or even any one individual storage block is generally insufficient to allow a computing device to determine any one or more individual datum without reference to another device or storage block.

For a $2^{nd}$ example and without limitation, in one embodiment, an information-bearing element might include information that is encoded or encrypted with the property that any one individual device or even any one individual storage block is generally insufficient to allow a computing device to determine any one or more individual datum without reference to a decoding or decrypting key.

For a 3$^{rd}$ example and without limitation, in one embodiment, an information-bearing element might include information that is accessible to a software component using a communication system, such as for example with the assistance of a coding system associated with a communication system, a communication protocol, an error-correcting code associated with an information-bearing element, a method or technique of associating or including data or information within a signal (such as for example a communication signal), or any one or more techniques known in the fields of computing science that might have the effect of allowing the recovery of information, either concurrently or at a later time.

Where such information is specified, that information might be interpretable by a computing device, or other data-processing device, as representing instructions to a device (including the possibility of a Turing-equivalent computing device operating under control of those instructions, either with or without additional instructions with the effect of providing additional functionality), as representing data to be compared, manipulated, reviewed, or otherwise processed by a device, as representing data describing a format of such data, such as for example a schema for a relational database, as representing metadata of some type, such as for example a measure of freshness or reliability of information, or otherwise, or combinations or conjunctions thereof.

For example and without limitation, in one embodiment, an information-bearing element might include information interpretable as hardware instructions, assembly-language instructions, compilable or interpretable higher-level language instructions, scripting instructions, or otherwise, or some combination or conjunction thereof.

For example and without limitation, in one embodiment, an information-bearing element might include information interpretable as a data encoding format, as a relational database schema or other database descriptor, as a data structure such as a tree structure, directed acyclic graph, heap storage, stack frame, or otherwise, or some combination or conjunction thereof.

For example and without limitation, in one embodiment, an information-bearing element might include data values to be compared, manipulated, reviewed, or otherwise processed by a device, such as for example a set of integers, floating-point numbers (for example, in an IEEE floating-point number standard format), data structures representing or indicative of other model-able elements, or otherwise, or some combination or conjunction thereof.

For example and without limitation, in one embodiment, an information-bearing element might include metadata of some type, such as for example a measure of freshness or reliability of information, a measure of precision or significance of figures, a measure of possible error, or otherwise, or combinations or conjunctions thereof.

Although this description is focused upon particular types of information as detailed herein, in the context of the invention, there is no particular requirement for any such limitation. For example and without limitation, there is no particular requirement that information or data need be represented in a digital format (an analog format might be a substitute), in a binary format (a format in a digital radix or other radix might be a substitute), in a time-division or space-division format (a format using a frequency-division or code-division format might be a substitute), or otherwise, or some combination or conjunction thereof.

FIG. 1

FIG. 1 shows a conceptual drawing of a system 100, including elements shown in the figure, including at least one or more communication networks 110, and one or more system resources 120.

System resources 120 are coupled to the one or more communication networks 110 and are each capable of sending and receiving messages using one or more communication networks 110. This has the effect that system resources 120 can be logically or physically remote, yet capable of communication and of cooperation.

In one embodiment, the communication networks 110 might include any technique for computer communication, including a LAN, WAN, internet, enterprise network, a secure structure thereof such as a VPN, or otherwise.

The system resources 120 each include a communication port, coupled to one or more of the communication networks 110. System resources 120 might include a computing device, including a processor, memory and mass storage, and data and instructions. System resources 120 might include a storage device, including memory and mass storage, and capable of maintaining information in response to storage instructions and retrieval instructions. System resources 120 might also include other and further hardware devices or software elements. For example and without limitation, system resources 120 might include a clock or other timing device, or otherwise.

Test Controller

One or more system resources 120 maintains or has access to one or more test leaders 131, and maintains or has access to one or more test suites 132.

While this application is primarily directed to cases in which there is one such test leader 131 and set of test suites 132, in the context of the invention, there is no particular requirement for any such limitation. For example and without limitation, there might be multiple such test leaders 131 or sets of test suites 132, which might operate independently or which might operate cooperatively.

The test suites 132 each include a set of data and instructions, each describing a procedure to carry out to determine if a feature of the system 100 operates correctly under selected conditions. In one embodiment, each test suite 132 includes a set of resource designations 132a, a set of suite instructions 132b, and a set of suite tags 132c.

The resource designations 132a are interpretable to indicate what types of system resources 120, or in some cases what particular ones of the system resources 120, are used by the test suite 132. While this application is primarily directed to cases in which resource designations 132a are needed for operation of the test suite 132, in the context of the invention, there is no particular requirement for any such limitation. For example and without limitation, one or more resource designations 132a might be optional, as for example where a test suite 132 is intended to involve multiple system resources 120, with a certain minimum number that are needed and a greater minimum number that are desired.

The suite instructions 132b are interpretable to indicate what operations are to be performed by the resource designations 132a. In one embodiment, the suite instructions 132b also are interpretable to indicate in what order those operations are to be performed, and in some cases, with what timing those operations are to be performed. For example and without limitation, suite instructions 132b might be interpretable to cause resource designations 132a to allocate or de-allocate storage or shared namespaces, to set or reset locks, or otherwise.

In one embodiment, the suite instructions 132b are interpreted by the test leader 131, which sends messages using the communication network to the test elements 141 (as described below), causing the latter to perform the operations indicated by the suite instructions 132b at those times and in that order indicated by the suite instructions 132b, upon the direction of the test leader 131. This has the effect that the test elements 141 perform their operations precisely as indicated by the suite instructions 132b, as the test leader 131 directs them to perform those operations when they are called for.

In alternative embodiments, the suite instructions 132b might be distributed by the test leader 131 to the test elements 141, causing the latter to perform the operations indicated by the suite instructions at those times and in that order indicated by the suite instructions 132b, but upon their own initiative. In such cases where timing is of the essence, the test elements 141 might either (1) synchronize their timers with the test leader 131, or (2) confirm the timing and order of their operations with the test leader 131, or some other hardware device or software element operating in cooperation or conjunction with the test leader 131. This also has the effect that the test elements 141 perform their operations precisely as indicated by the suite instructions 132b, as they confirm with the test leader 131 that they perform those operations when they are called for. In such alternative embodiments, synchronization with the test leader 131 might involve an artificial clock, that is, a "clock" not measuring any particular time value; there is no particular requirement that a clock itself representative of real time is needed.

The suite tags 132c are interpretable to indicate facts about the test suite 132. The test leader 131 might access those suite tags 132c to determine if one or more particular test suites 132 are appropriate for testing at some selected time. For some examples and without limitation, one or more suite tags 132c might indicate one or more of the following:
- a feature of the system 10o to be tested by the test suite 132, such as for example: a CIFS or NFS feature, a replication feature, a feature relating to the "Samba" software, a SCSI or iSCSI feature, or otherwise;
- a particular bug ID associated with a bug detected in the system 100, with the effect of being able to test if a bug associated with that particular bug ID has been fixed;
- a particular type of hardware device or software element in use with the system 100, such as for example one or more variants of the "Windows" operating system, or otherwise;
- a particular set of test suites 132 to be run at selected times, such as for example a suite tag 132c such as "daily," "weekly," and the like, or a suite tag 132c such as "smoke," sometimes used to designate whether a particular change to the system 100 might cause a major error, or otherwise.

The test leaders 131 each include a process or thread operating on a system resource 120, such as under control of data and instructions to perform the functions described herein. While this application is primarily directed to cases in which test leaders 131 are implemented as software elements operating on a hardware substrate, in the context of the invention, there is no particular requirement for any such limitation. For example and without limitation, one or more test leaders 131 might include general-purpose hardware particularly dedicated to at least some of those functions, or might include special-purpose hardware particularly dedicated to at least some of those functions, some combination or conjunction thereof, or otherwise.

While this application is primarily directed to cases in which each test leader 131 operates independently, and in which the test suites 132 conducted by each test leader 131 are independent, in the context of the invention, there is no particular requirement for any such limitation. For example and without limitation, multiple test leaders 131 might operate in cooperation or conjunction to perform one or more test suites 132 collectively.

Test Elements

One or more system resources 120 includes a test element 141, which maintains or has access to one or more test resources 142, and provides one or more presentable results 143.

The test elements 141 might include, as described above with respect to system resources 120, one or more of the following:
- a computing device, including a processor, memory and mass storage, and data and instructions;
- a storage device, including memory and mass storage, and capable of maintaining information in response to storage instructions and retrieval instructions;
- other and further hardware devices or software elements, such as for example, a clock or other timing device, or otherwise.

In one embodiment, the test leaders 131 are capable of communication with each of the test elements 141, and are capable of directing those test elements 141 to carry out operations. The test leaders 131 select those test elements 141 in response to one or more test suites 132, and directs those test elements 141 to carry out operations in response to those one or more test suites 132.

For example and without limitation, if a test suite 132 is designed to determine if a locking mechanism in the system 100 is working, that test suite 132 might include the following:
- data indicating that $1^{st}$ test element 141 is needed on which a lock can be set and reset;
- data indicating that a $2^{nd}$ test element 141 is needed which can access that lock and set it;
- data indicating that a $3^{rd}$ test element 141 is needed which can access a system resource 120 which is protected by that lock;
- instructions indicating that the $2^{nd}$ test element 141 should be directed to set that lock;
- instructions indicating that the $3^{rd}$ test element 141 should be directed to attempt to access that system resource 120 which is protected by that lock;
- instructions indicating whether that $3^{rd}$ test element 141 is successful in accessing that system resource 120 which is protected by that lock, notwithstanding the lock.

In this example, the $1^{st}$ test element 141, the $2^{nd}$ test element 141, and the $3^{rd}$ test element 141, might be embodied in the same one or more devices. Other examples of test suites 132 might have differing sets of data and instructions, either to determine the function of similar aspects of the system 100, or to determine other aspects of the system 100. Similarly, in other examples of test suites 132, multiple test elements 141 might be embodied in one or more hardware devices, or in one or more software elements operating on one or more hardware devices.

While this application is primarily directed to cases in which test suites 132 are intended to determine if aspects of the system 100 are designed or working properly, in the context of the invention, there is no particular requirement for any such limitation. For example and without limitation, one or more test suites 132 might include tests to determine how effectively or efficiently aspects of the system 100 are working, or if more than one aspect of the system 100 operate properly together, or if more than one aspect of the system operate effectively or efficiently together, or otherwise.

One or more test resources 142 include or have access to system resources 120 to be used with a test suite 132. When so used, those system resources 120 act as resource designations 132a.

One or more test resources 142 include or have access to data or other results from operations performed as part of one or more test suites 132, which might be reported to the test leader 131 upon the latter's request. For a $1^{st}$ example and without limitation, each test resource 142 would report to the test leader 131 if that particular test resource 142 was returned to the same state after the test suite 132 as it was before the test suite 132. Failure to do so would generally be considered an error. For a $2^{nd}$ example and without limitation, the test leader 131 might request particular data from each test resource 142, such as for example whether it was possible to write to a shared resource despite instructions in the test suite 132 to set a lock protecting that resource. Being able to break the lock, absent some circumstance allowing the lock to be broken, would generally be considered an error.

In one embodiment, the test leader 131 collects such data or other results, and presents them for review by one or more users as one or more presentable results 143. In alternative embodiments, the test elements 141 might collect those data or other results on their own initiative, and place them in a location and format available for review by one or more users as one or more presentable results 143. These each have the effect that one or more such users would be able to determine if the test suites 132 were performed without error.

FIG. 2

Figure 2:
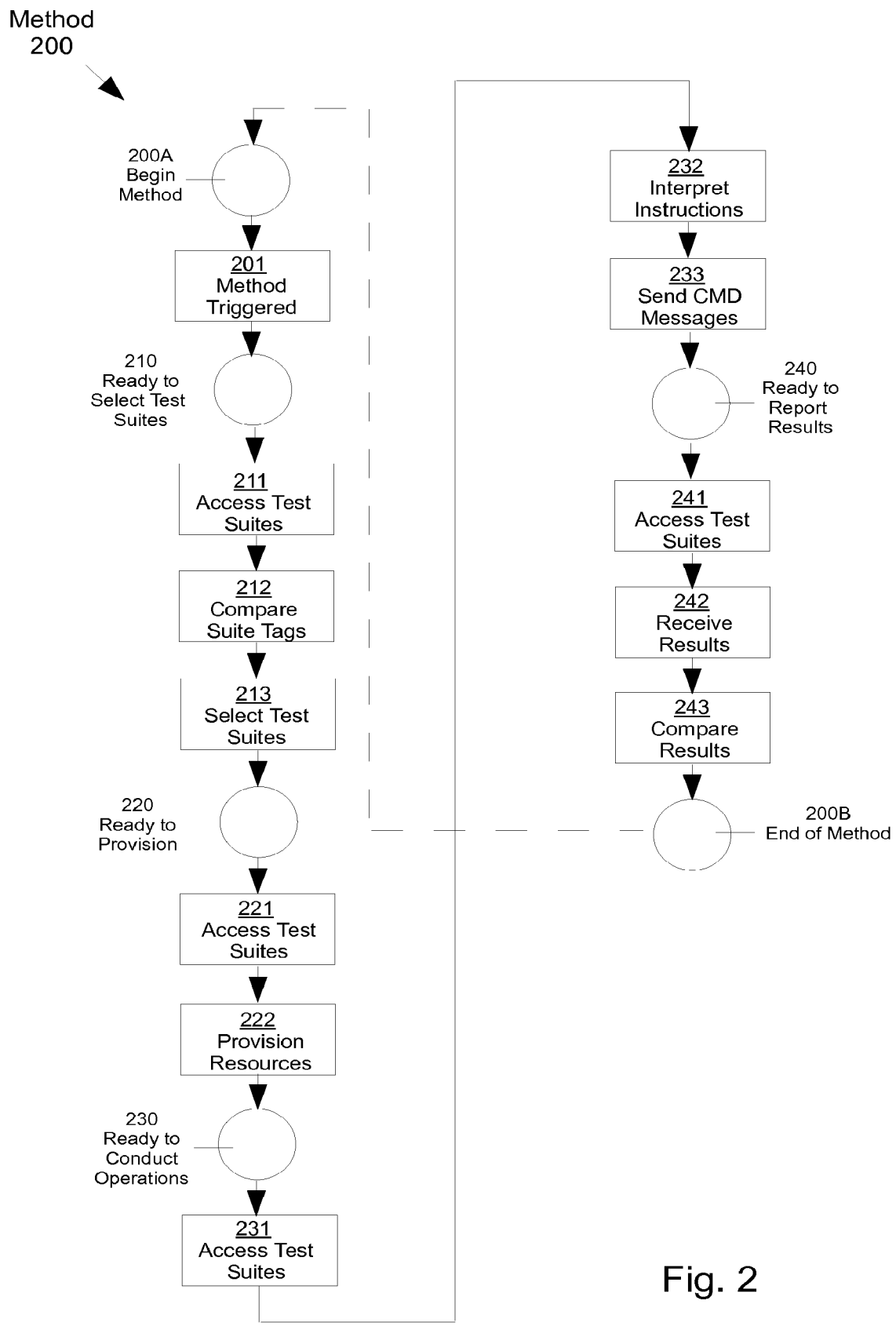
FIG. 2 shows a conceptual drawing of a method.

FIG. 2 shows a conceptual drawing of a method 200, including flow labels and method steps as shown in the figure.

As described herein, the method steps are shown in the figure and described in a linear order. However, in the context of the invention, there is no particular requirement that the flow labels or method steps be encountered or performed linearly, in any particular order, or by any particular device. For example and without limitation, the flow labels and method steps might be encountered or performed in parallel, in a pipelined manner, by a single device or by multiple devices, by a general-purpose processor or by a special-purpose processor (or other special-purpose circuitry disposed for carrying out part or all of the method 200), by one or more processes or threads, at one or more locations, and in general, using any one or more of the techniques known in the many arts of computing science.

Beginning of Method

Reaching a flow label 200A indicates a beginning of the method 200.

At a step 201, the method 200 is triggered and begins operation. In various embodiments, the method 200 might be triggered by any circumstance in which it is desirable to perform one or more tests of the system 100, such as for example, one or more of the following:

- a change in the structure of the system 100, such as for example an bug-fix or upgrade in the system 100;
- a command or other intervention by a user, such as for example an explicit command to perform one or more test suites 132;
- a detection of a condition for which a user has designated should be watched for, such as for example a slow-down in the system 100, or a suspected error condition;
- a detection of an error condition, or a partial error condition, or a warning condition, in the system 100, or any portion thereof;
- a passage of time, a trigger such as a clock-timer or watchdog-timer interrupt, or similar such event, such as for example a set of test suites 132 to be performed daily or weekly, or otherwise;
- by other techniques or triggers, such as for example those known in the many fields of computing science.

While this description is at least partially directed to embodiments with respect to specific techniques for triggering the method 200, such as in this step, in the context of the invention, there is no particular requirement for any such limitation. The method 200 might be triggered, such as in this step, by any technique suitable for triggering a computation, method, or process.

The method 200 proceeds with the flow label 210.

Selecting Test Suites

Reaching a flow label 210 indicates that the method 200 is ready to select one or more test suites 132.

At a step 211, the test leaders 131 access the test suites 132.

At a step 212, the test leaders 131 compare the suite tags 132c from the test suites 132 against one or more suite tags 132c which those test leaders 131 have determined should be performed.

As noted above, the method 200 might be triggered in one of several ways. Those ways might include when a test suite 132 with a suite tag 132c shows up in a periodic search, or a search triggered by an event, such as an instruction or request by a user.

If the test leaders 131 determine that there is at least one suite tag 132c which matches a test suite 132 to be performed, the method 200 proceeds with the next step. Otherwise, the method 200 proceeds with the flow label 200B, where it terminates.

At a step 213, the test leaders 131 select those test suites 132 for which suite tags 132c match one or more test suites 132 to be performed, and prepare to perform those test suites 132.

Provisioning Test Suites

Reaching a flow label 220 indicates that the method 200 is ready to provision one or more test suites 132.

At a step 221, the test leaders 131 access test suites 132 to be performed.

In such cases in which multiple test leaders 131 operate independently, each of those multiple test leaders 131 has its own test suites 132. Each of those multiple test leaders 131 independently performs its test suites 132, independently provisions test elements 141 in response to those test suites 132, independently directs those test elements 141 to perform operations in response to those test suites 132, and independently provides presentable results 143 (as described below) in response to those test suites 132.

In such cases in which multiple test leaders 131 operate in cooperation or conjunction, those multiple test leaders 131 exchange information regarding test suites 132, their resource designations 132a, and their suite instructions 132b. This has the effect that multiple test leaders 131 can conduct operations as indicated by those suite instructions 132b while maintaining coherence between those suite instructions 132b.

At a step 222, the test leaders 131, in response to test suites 132, provision system resources 120, in response to resource designations 132a, to be used with those test suites 132.

In one embodiment, a test leader 131 with multiple test suites 132 determines all the system resources 120 needed by those multiple test suites 132, with the effect that the set of system resources 120 that test leader 131 provisions is the union of all such system resources 120, in response to resource designations 132a.

If a system resource 120 is needed for more than one such test suite 132, the test leader 131 provisions that system resource 120 for a $1^{st}$ such test suite 132, conducts that $1^{st}$ such test suite 132, re-provisions that system resource 120 for a $2^{nd}$ such test suite 132, conducts that $2^{nd}$ such test suite 132, and so on. This has the effect that each system resource 120 is used for those test suites 132 which need it, and is not used with multiple test suites 132 where that would result in a conflict. If a system resource 120 is needed for multiple test suites 132, and might be used concurrently for those multiple test suites 132, the test leader 131 provisions that system resource 120 for those multiple test suites 132 concurrently. Since that system resource 120 can be used concurrently for those multiple test suites 132, those multiple test suites 132 might be performed concurrently without any conflict.

In one embodiment, where a test leader 131 has multiple test suites 132 having resource designations 132a which might conflict, the test leader 131 orders the test suites 132 (unless instructed not to) so that those multiple test suites 132 can each be performed, with best reasonably practical efficiency (or another measure of performance) in allocating and de-allocating system resource 120, in response to resource designations 132a. For example and without limitation, if a $1^{st}$ test suite 132 needs a particular system resource 120 for only a relatively short time duration, while a $2^{nd}$ test suite 132 needs that same particular system resource 120 for a relatively much longer time duration, the test leader 131 might perform the $1^{st}$ test suite 132 earlier, with the effect that the particular system resource 120 is in use only for that relatively short time duration while performing the $1^{st}$ test suite 132, freeing it for use with the $2^{nd}$ test suite 132. This has the effect that the $2^{nd}$ test suite 132 need only wait for that relatively short time duration, rather than causing that $1^{st}$ test suite 132 to wait for that relatively much longer time duration. In this example, if the $1^{st}$ test suite 132 and the $2^{nd}$ test suite 132 have other resources to wait for, the test leader 131 might make a different determination regarding which test suite 132 should be performed earlier.

Conducting Test Suite Operations

Reaching a flow label 230 indicates that the method 200 is ready to conduct operations with respect to one or more test suites 132.

At a step 231, the test leaders 131 at their associated test leaders 131 access test suites 132 to be performed.

At a step 232, the test leaders 131, in response to those test suites 132 to be performed, interpret the instructions indicated by those test suites 132.

At a step 233, the test leaders 131, in response to those instructions indicated by those test suites 132, send command messages to test resources 142 at their associated test elements 141, directing those test resources 142 to perform operations designated by those instructions.

In one embodiment, the test leaders 131 send each command message to test resources 142 at a time when the operation associated with the particular command message is to be performed. This has the effect that, in a working system 100, each test resource 142 performs its commanded operation at the time when the test leader 131 directs it to do so.

In alternative embodiments, the test leaders 131 may send command messages to test resources 142 at an earlier time, with instructions regarding when operations indicated by those command messages should be conducted. In such cases, the test resources 142 at their associated test elements 141 each either (1) synchronize their operation with the test leader 131, or (2) request a go-ahead from the test leader 131 at the time when operations indicated by those command messages should be conducted. Either of these has the effect that the test resources 142 perform their operations at times when they should, and has the effect that disparate clocking times, or flight time across the communication network, does not cause any timing errors.

Reporting Test Suite Results

Reaching a flow label 24o indicates that the method 200 is ready to report presentable results 143 with respect to one or more test suites 132.

At a step 241, the test leaders 131 access test suites 132 to be performed.

At a step 242, the test leaders 131 receive results from test resources 142 at test elements 141. The test resources 142 might send one or more messages including results to the test leaders 131, or might store one or more results in a database or other data structure accessible to the test leaders 131. Either technique has the effect that the test leaders 131 obtain access to results from the test resources 142.

At a step 243, the test leaders 131 compare the results from the test resources 142 with those results specified in the test suites 132. The test leaders 131 construct presentable results 143 for review by users.

The method 200 proceeds with the flow label 200B.

End of Method

Reaching a flow label 200B indicates an end of the method 200.

In one embodiment, the method 200 might be readied for re-performance in response to a trigger as described with respect to the flow label 200A.

Alternative Embodiments

The invention has applicability and generality to other aspects of information system management and system reporting, including at least automated command, control, and management of complex systems;

automated reporting of system status to operators, users, and other interested entities;

automated self-repair of frangible complex systems;

machine learning of operation of complex systems, particularly those that might be distributed or which might have distributed status dependencies.

The invention claimed is:

1. A system including a distributed computing system operating using a distributed operating system, the distributed computing system including a plurality of test leaders including computing devices using instructions, each independently performing one or more of its own test suites, the test leaders each independently provisioning one or more resources for its own test suites, wherein the test leaders exchange information with respect to one or more of: test suites, resource designations, or test suite instructions;

the computing devices using instructions directing those test leaders to send instructions to resources in the distributed computing system to perform operations according to those test suites, the operations according to those test suites including one or more operations of those resources using the distributed operating system and at least potentially interfering when performed concurrently;

the computing devices using instructions directing those test leaders to access one or more results from those operations, to compare results from those operations with one or more results indicated by those test suites, and to access results from those operations;

wherein the distributed computing system includes messages from those resources to those test leaders.

2. A system as in claim 1,
including instructions at those test leaders to select one or more test suites matching suite tags for which test suites are to be performed.

3. A system as in claim 1,
including instructions at those test leaders to provision resources for a first test suite, conduct that first test suite, subsequently provision resources for a second test suite, and independently conduct that second test suite;
wherein when resources for the first test suite and the second test suite conflict, the test leader orders the first and the second test suite to be performed in response to a measure of performance.

4. A system as in claim 1,
wherein those operations according to those test suites are performed with-in a time to send messages between those resources and those test leaders.

5. A system as in claim 1,
wherein those instructions directing resources to perform operations include instructions to distribute information identifying those operations before those operations are to be performed;
wherein those resources include devices that identify those operations in response to that information; and
wherein those resources perform those operations at those times specified in that information.

6. A system as in claim 5,
wherein that information includes information identifying specific times when those operations are to be performed.

7. A system as in claim 1,
clocks at each of those test leaders and at each of those resources, the clocks at each test leader being synchronized with the resources instructed by that test leader;
wherein instructions from each test leader directing resources to perform operations are sent before those operations are to be performed.

8. A system as in claim 7,
including instructions directing those resources to send synchronization messages to those test leaders that those operations are about to be performed; and
including instructions directing those test leaders responding those synchronization messages from those resources.

9. A system as in claim 1,
including instructions directing those test leaders to provision one or more resources for a plurality of test suites and direct those resources to perform those test suites; and
including instructions directing those test leaders to perform those actions of provisioning and directing for at least a portion of those test suites, repeatedly until resources for all those test suites have been provisioned.

10. A system as in claim 1,
including instructions directing those resources to perform those test suites concurrently.

11. A system as in claim 1,
including instructions directing those test leaders to provision one or more resources in response to a measure of performance of those test suites.

12. A system as in claim 1,
including instructions directing those test leaders to provision one or more resources in response to those test suites, wherein use of those resources overlaps with respect to those test suites; and
including instructions directing those test leaders to provision one or more resources before sending messages to those resources to perform operations.

13. A system as in claim 1,
wherein those test suites include configuration information interpretable as indicating
one or more resources to be used in conjunction with those test suites;
one or more operations to be performed in conjunction with those test suites;
one or more tags distinguishing types of test suites.

14. A system as in claim 13,
wherein those resources include one or more of: data structures, processors, storage devices;
the data structures including one or more of: databases, locks, shared directories, test results.

15. A system as in claim 1,
wherein multiple test leaders each include instructions disposed to be independently performed on separate devices:
to receive messages from those resources including information with respect to one or more results from those operations,
to access at least some of those results,
to compare results from those operations with one or more results indicated by those test suites, and
to access results from those operations; and
the messages from those resources to those test leaders include information with respect to one or more results from those operations.

* * * * *